March 19, 1963   G. W. SWITZER, JR., ET AL   3,081,631
THERMOMETER WELL FOR PIPES
Filed Nov. 18, 1958
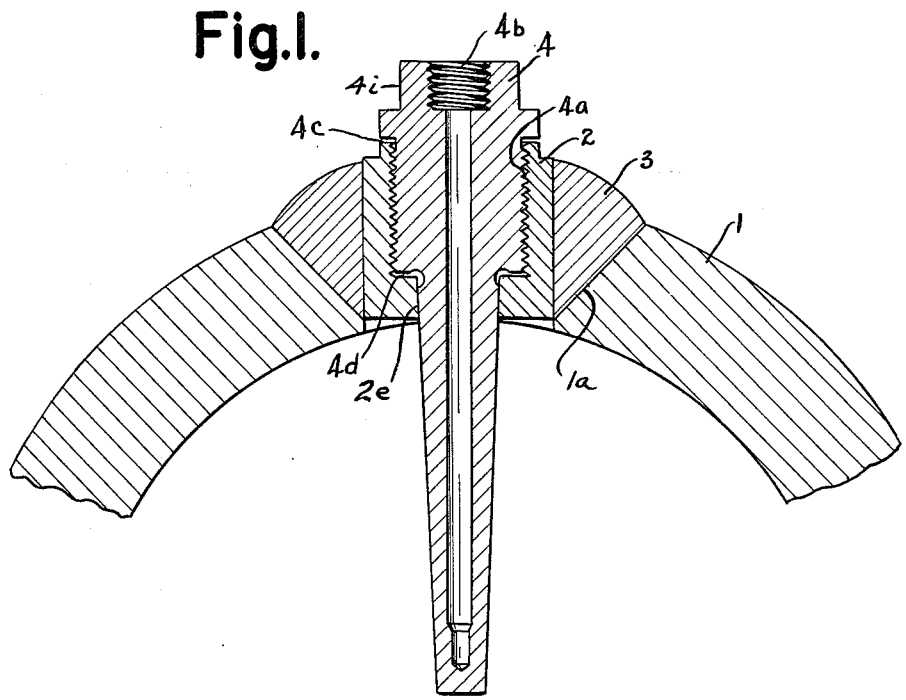
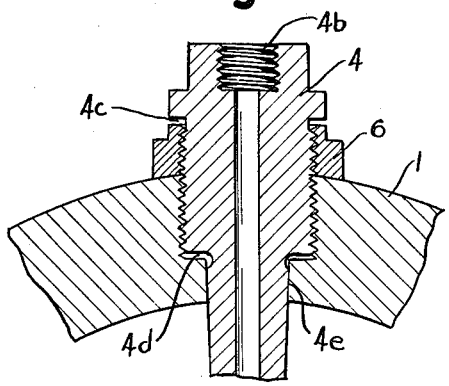
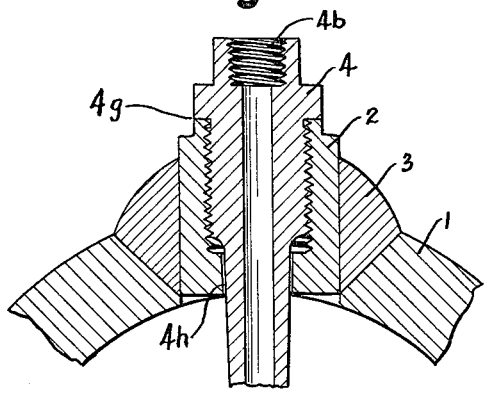
INVENTORS
George W. Switzer, Jr.
Alexander F. Smith III
BY
*William J. Ruano*
ATTORNEY.

3,081,631
THERMOMETER WELL FOR PIPES

George W. Switzer, Jr., Wyomissing Park, and Alexander F. Smith III, Wyomissing, Pa., assignors to Gilbert Associates, Inc., Reading, Pa.
Filed Nov. 18, 1958, Ser. No. 774,727
1 Claim. (Cl. 73—343)

This invention relates to improvements in detachable supports for holding thermometers and other testing devices inside a pipe for making measurements or taking test samples of liquids flowing through the pipe.

In various processes it is frequently necessary to have projections into a pipeline carrying fluids. These projections may be for the purpose of inserting temperature detection elements, such as thermometers, thermo-couples, or resistance elements or for the purpose of obtaining samples of the flowing fluid in the cross section of the flow. These projecting encasements or nozzles as the case may be are usually attached to the wall of the pipe by welding or threading. Objectionable features of the types of thermowells and sample nozzles heretofore available are as follows:

When the thermowells or nozzles are attached by threading or welding at the outside wall of the pipe, the point of support against the thrust and vibrations of the flowing fluid is remote from the point of force applied by the flowing fluid. This results in high stress in the projecting thermowell or nozzle sometimes causing breakage of the nozzle or thermowell with consequent danger from the escape of the fluid in the pipe and damage to the equipment downstream from the thermowell or nozzle location. If the thermowell or nozzle is made sufficiently strong to withstand the forces, it will be unnecessarily heavy and offer unnecessarily large obstruction to the flow of the fluid in the pipe.

When the thermowells or sampling nozzles are attached by threading into the pipe wall, leakage of the fluid in the pipe can occur through the threads. Attempts to seal weld the threads with a light welding bead are generally unsuccessful due to the difficulty of penetrating the groove of the threads with the welding bead. A heavy welding bead applied to accomplish the sealing of the threads then prevents later removal of the thermowell or nozzle for any purpose.

When the thermowells or nozzles are attached by welding to the pipe wall, this attachment must be made prior to heat treatment of the piping and subsequent descaling operation in order that the heat treatment and descaling can eliminate undesirable stresses and scale caused by the welding. Thus the thermowell or nozzle projecting into the pipe line constitutes an obstruction in the pipeline during preservice flushing and cleaning of the pipe. In addition, the thermowell or nozzle cannot later be removed for any purpose.

An object of the present invention is to provide a novel detachable unit for testing or sampling fluids flowing through the pipe, particularly fluids under high pressure, which unit is devoid of the above named disadvantages of conventional types of units.

A more specific object of the present invention is to provide a detachable well unit for supporting temperature detecting elements, such as the thermometers, thermocouples or resistance elements, or for samplers in which there is positive support at the inner wall of the pipe, and wherein a pressure seal is provided which is separate from and independent of the screw threads attaching the well to the adapter or boss secured to the pipe.

A further object of the invention is to provide a seal weld pressure seal which is arranged for non-destructive removal of the thermometer well unit or similar unit by merely unscrewing the well from the adapter.

Broadly stated, the present improvement consists of a boss or well attachment which is adapted to be fitted into a pipe in a manner so as to provide direct support adjacent the inside wall of the pipe, also wherein the nozzle or thermometer well is attached to its boss or to the pipe by straight threads with a separate lip for seal welding which is entirely removed from the threads so as to be independent thereof.

A further object is to provide an efficient, readily detachable unit for supporting measuring and testing devices of various kinds, which unit provides very firm support for such devices without unduly enlarging the size and weight of the unit, also which is relatively simple and inexpensive in construction as compared to the prior devices.

Other objects and advantages of the present invention will become more apparent from a study of the following description taken with the accompanying drawing wherein:

FIG. 1 is a vertical cross-sectional view of a unit embodying the principles of the present invention shown inserted in a pipe, wherein the boss or well is welded to the pipe.

FIG. 2 is a vertical cross-sectional view of a modification wherein the boss is integrally formed on or built up from the pipe into which the unit is threaded, and FIG. 3 is a vertical cross-sectional view through a still further modification similar to FIG. 1 but wherein the unit is not provided with a support adjacent the inner surface of the pipe.

Referring more particularly to FIG. 1 of the drawing, numeral 1 denotes a fragmentary portion of a pipe, such as a large pipe, which conducts fluid under high pressure, particularly liquids, and which has a tapered, radial hole portion $1a$ in which an adapter or well 2 in the form of a boss is inserted and which is welded to the pipe by means of a weld 3. A measuring or testing unit supporting element or holder 4 is provided with a threaded portion $4a$ which screw threadedly engages a corresponding well portion in boss 2 and is provided with a top nut shaped portion $4i$ to facilitate turning by a wrench. The interior of element 4 is hollowed out and is preferably provided with a threaded portion $4b$ into which may be screw threaded a temperature detecting element, such as a thermometer, thermo-couple, or resistance element, or other measuring device or a sampling unit for obtaining samples of the fluid flowing through the pipe.

It will be particularly noted that the lower inner wall portion $2e$ of boss 2, which is slightly tapered, provides a direct support for the intermediate portion of the holding element 4, the lower end of which projects downwardly into the pipe interior, so as to relieve the threads from having to withstand a moment arm produced on holding element 4 by fluids flowing in the pipe, particularly liquids under high pressure or velocity. It will also be noted that a seal $4c$ is made between a collar portion of holder 4 and the boss 2 so that the pressure seal is made at a point which is entirely separate and independent from the threaded connection. Therefore, when it is desired to form the seal there will be no interference with the threaded connection, or necessity of introducing solder therein, or to form a bead thereon, furthermore non-destructive removal of the holding element is provided since once the seal is broken at $4c$ the holder 4 can be unscrewed and removed with facility.

The thermometer holder element 4 and its boss 2 preferably have equal coefficients of thermal expansion, furthermore the portions of the holder element projecting into the pipe beyond the point of support, that is, beyond surface $2e$ must be strong enough to withstand the forces exerted and induced by the fluid flowing in the pipe. If holder element 4 supports a sampling unit, its intermediate portion may be perforated to allow fluid to enter the sampling unit.

FIG. 2 shows a modification wherein instead of providing a weld between the boss 2 and pipe 1 the pipe is integrally formed with an integral boss 6 which is built up from the pipe wall and which is internally threaded so as to receive the threaded portion of the holder element 4. Holder element 4 is otherwise of the same construction as shown in FIG. 1 and has the same direct support at 4e, that is, the inner surface of the hole in the pipe which is adjacent to the interior of the pipe, and wherein a gap is provided at 4d and an outside seal at 4c, whereby the seal 4c is independent of the threaded connection between holder element 4 and the pipe.

FIG. 3 shows a still further modification which is similar in some respects to that shown in FIG. 1 in that the internally-threaded boss 2 is welded by means of a weld 3 to the tapered hole 1. However, in this modification, the collar portion of the holder unit 4 is tightly seated at 4g against the top of the well or boss 2 so as to provide a metal to metal seal, and wherein instead of providing a direct support between the bottom hole of boss 2 and holder, there is a small gap provided at 4h which allows predetermined movement of the holder element 4 with respect to the boss or well unit 2, and in which construction the threads bear the entire support load aided somewhat by the metal-to-metal seal.

Thus it will be seen that we have provided an efficient unit for detachably supporting measuring or test elements, such as thermometers and sampling units, inside a pipe in which fluid is flowing, particularly fluid under high pressure, and which is directly supported at or adjacent the interior surface of the pipe, also which provides a separate seal from the connection between the well and holder so as to make it unnecessary to depend upon the threaded connection between the holder and boss for withstanding forces of the flowing fluid; furthermore, we have provided a simple and relatively inexpensive assembly comprising relatively few parts of inexpensive construction and of relatively small size, so as to not only assure support but provide an effective seal that will withstand even very high pressures.

While we have illustrated and described several embodiments of our invention, it will be understood that these are by way of illustration only, and the various changes and modifications may be made within the contemplation of our invention and within the scope of the following claim.

We claim:

In combination with a pipe for conducting fluid at relatively high pressure, a radially extending hole in the wall of the pipe, an instrument holding unit extending through said hole for receiving an instrument for testing said fluid, said holding unit being provided with an inner bore terminating in an upper threaded portion and having a nut portion, an externally threaded body portion and an integral collar portion intermediate said nut portion and body portion immediately above and extending radially outwardly of said body portion and of said nut portion, an internally threaded annular adapter which is screw threaded to said body portion and which is integrally welded to said pipe externally of the inner surface thereof, these being a small gap between the top portion of said adapter and the lower surface of said collar portion which is adapted to be bridged by a seal welding material to form a fluid-tight seal after said holding unit is screwed tightly in said adapter, said holding unit having a lower portion of reduced cross-section projecting into said pipe and being provided with direct lateral support by a downwardly and inwardly tapered surface upon flexing of said lower portion as the result of pressure of said fluid.

References Cited in the file of this patent

UNITED STATES PATENTS

| | | |
|---|---|---|
| 1,683,743 | Thompson | Sept. 11, 1928 |
| 1,847,438 | Moulding | Mar. 1, 1932 |
| 2,560,455 | Knight | July 10, 1951 |